(12) United States Patent
Grice

(10) Patent No.: US 9,963,221 B2
(45) Date of Patent: May 8, 2018

(54) UNISON RING SYSTEM FOR COUNTER ROTATING PROPELLERS

(71) Applicant: ROLLS-ROYCE PLC, London (GB)

(72) Inventor: Christopher Michael Grice, Derby (GB)

(73) Assignee: ROLLS-ROYCE plc, London (GB)

( * ) Notice: Subject to any disclaimer, the term of this patent is extended or adjusted under 35 U.S.C. 154(b) by 321 days.

(21) Appl. No.: 14/692,308

(22) Filed: Apr. 21, 2015

(65) Prior Publication Data

US 2015/0321749 A1 Nov. 12, 2015

(30) Foreign Application Priority Data

May 8, 2014 (GB) .................................. 1408103.8

(51) Int. Cl.
*B64C 11/06* (2006.01)
*B64C 11/48* (2006.01)
(Continued)

(52) U.S. Cl.
CPC ............ *B64C 11/06* (2013.01); *B64C 11/306* (2013.01); *B64C 11/48* (2013.01); *F16C 19/24* (2013.01)

(58) Field of Classification Search
CPC ......... B64C 27/57; B64C 11/40; B64C 11/42; B64C 11/06; B64C 11/48; B64C 11/308; B64C 11/306; F16C 19/24
See application file for complete search history.

(56) References Cited

U.S. PATENT DOCUMENTS 2,486,016 A 10/1949 Gaskell 4,657,484 A 4/1987 Wakeman et al.
(Continued)

FOREIGN PATENT DOCUMENTS

| CH | 233498 A | 7/1994 |
|---|---|---|
| EP | 2 436 596 A2 | 4/2012 |

(Continued)

OTHER PUBLICATIONS

Oct. 23, 2015 Search Report Issued in European Patent Application No. 15 16 4452.

(Continued)

*Primary Examiner* — Logan Kraft
*Assistant Examiner* — Peter T Hrubiec
(74) *Attorney, Agent, or Firm* — Oliff PLC

(57) ABSTRACT

Unison ring system includes first unison ring portion, second unison ring portion, and bearing. Second unison ring portion is co-axial with first unison ring portion. First unison ring portion includes first unison ring and first bearing location portion and second unison ring portion includes second unison ring and second bearing location portion. First bearing location portion is co-axial with first unison ring and projects axially from first unison ring, while second bearing location portion is co-axial with second unison ring and projects axially from second unison ring. First bearing location portion includes outwardly opening groove, and second bearing location portion includes inwardly opening groove. First unison ring portion and second unison ring portion positioned with first bearing location portion being concentric with second bearing location portion defining annular cavity there between. Bearing is accommodated in annular cavity, with axial length of annular cavity being greater than axial length of bearing.

4 Claims, 4 Drawing Sheets

(51) Int. Cl.
*B64C 11/30* (2006.01)
*F16C 19/24* (2006.01)

(56) References Cited

U.S. PATENT DOCUMENTS

| | | | |
|---|---|---|---|
| 4,842,484 A | 6/1989 | Johnson | |
| 6,666,585 B1 * | 12/2003 | Kotzalas | F16C 33/4611 |
| | | | 29/898.064 |
| 8,444,388 B2 * | 5/2013 | Gallet | F02C 7/36 |
| | | | 416/127 |
| 2013/0011259 A1 | 1/2013 | Balk et al. | |

FOREIGN PATENT DOCUMENTS

| EP | 2 525 046 A2 | 11/2012 |
|---|---|---|
| EP | 2 626 521 A1 | 8/2013 |

OTHER PUBLICATIONS

Nov. 18, 2014 Search Report issued in British Application No. 1408103.8.

* cited by examiner

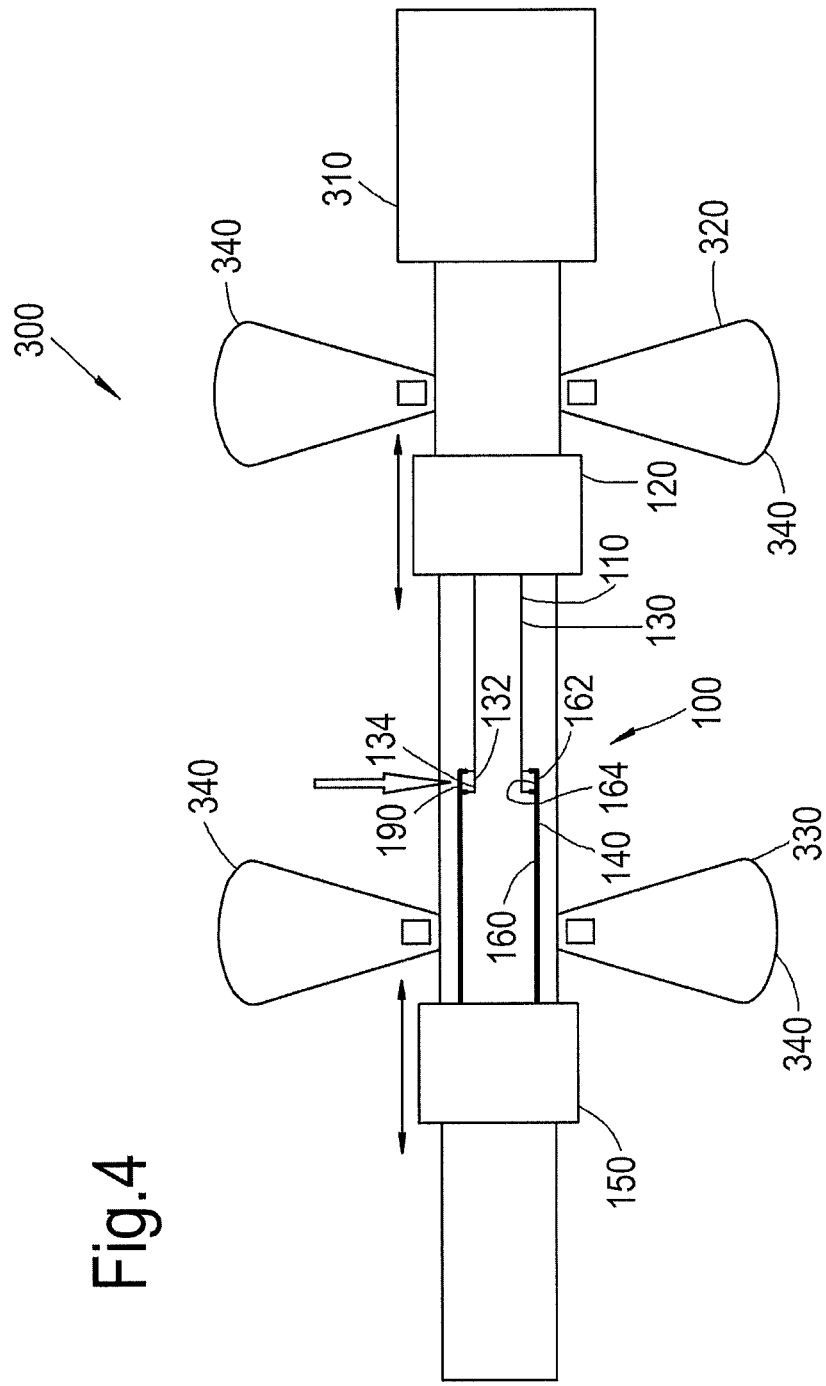

UNISON RING SYSTEM FOR COUNTER ROTATING PROPELLERS

This disclosure claims the benefit of UK Patent Application No. 1408103.8, filed on 8 May 2014, which is hereby incorporated herein in its entirety.

FIELD OF THE INVENTION

The present invention relates to a propeller pitch adjusting mechanism and particularly, but not exclusively, to a propeller pitch adjusting mechanism for an aircraft having contra-rotating propellers.

BACKGROUND TO THE INVENTION

It is well known to vary the pitch of the blades on an aircraft propeller, for example in order to maintain the rotational speed of the propeller within close limits. This in turn provides improved performance over a wide range of flight conditions, and enables thrust reversal during landing and ground manoeuvring of the aircraft. It also importantly allows for the feathering of the propeller in the event of an engine shutdown in flight.

It is known to use a pitch lock mechanism to lock the propeller blades in their current position in the event of a failure of the blade pitch adjusting mechanism.

When an engine is shutdown in flight, an unfeathered propeller can present a large and flat surface to the oncoming airflow if the propellers have a hydraulic failure and do not have a pitch lock mechanism. This will cause a large drag force on the aircraft which can result in a loss of control of the aircraft.

Even where a pitch lock mechanism is provided, a failure in the propeller blade pitch control system may cause the aircraft to crash, and will invariably result in the aircraft mission being aborted.

It is desirable to provide a propeller pitch adjusting mechanism for a contra-rotating propeller system that provides a measure of control over propeller blade pitch in the event of the failure of blade pitch control for one of the propellers.

STATEMENTS OF INVENTION

According to a first aspect of the present invention there is provided a unison ring system comprising:
  a first unison ring portion;
  a second unison ring portion, the second unison ring portion being co-axial with the first unison ring portion; and
  a bearing;
  the first unison ring portion comprising:
    a first unison ring; and
    a first bearing location portion;
  the second unison ring portion comprising:
    a second unison ring; and
    a second bearing location portion;
  wherein the first bearing location portion is co-axial with the first unison ring and projects axially from the first unison ring, the second bearing location portion is co-axial with the second unison ring and projects axially from the second unison ring,
  the first bearing location portion comprising a radially outwardly opening groove, the second bearing location portion comprising a radially inwardly opening groove, the first unison ring portion and the second unison ring portion being axially positioned such that the first bearing location portion is concentric with the second bearing location portion thereby defining an annular cavity therebetween;
  the bearing being accommodated in the annular cavity, an axial length of the annular cavity being greater than an axial length of the bearing.

The first unison ring portion controls the pitch of the propeller blades on a first propeller assembly and the second unison ring portion controls the pitch of the propeller blades on a second propeller assembly.

The first unison ring portion and the second unison ring portion are separately controllable in order to maintain each of the corresponding first and second propeller assemblies at substantially constant rotational speeds. Movement of the first unison ring portion will closely correspond to movement of the second unison ring portion, although there will be slight variations therebetween.

The first unison ring portion and the second unison ring portion are mechanically linked to one another by the bearing, which is housed within the co-operating first and second bearing location portions.

The difference in axial length between the bearing and the annular cavity accommodates the slight variation between the independent movement of each of the first unison ring portion and the second unison ring portion during normal control of the respective first and second propeller assemblies.

In the event of a failure of the actuating system of one of the first unison ring portion and the second unison ring portion, the actuating system of the other one of the first unison ring portion and the second unison ring portion will drive the failed unison ring portion via the co-operating first and second bearing location portions and bearing.

The control of the failed unison ring portion will not be optimal due to the offset resulting from the difference in axial length between the bearing and the annular cavity. However the system will maintain control of the failed unison ring portion which will enable the aircraft to complete its mission albeit at reduced efficiency. The system of the invention will also prevent a propeller overspeed event, which as described above is likely to result in loss of control of the aircraft. This makes the system of the invention convenient and economical for a user.

Optionally, the first bearing location portion is integrally formed with the first unison ring.

In one embodiment of the invention the first bearing location portion is formed as an extension of the first unison ring. This makes the first bearing location portion lighter and stronger and advantageous in weight critical applications.

In another embodiment of the invention the first bearing location portion is formed as a separate component from the first unison ring and is mechanically attached thereto by, for example, threaded fasteners. This arrangement enables the system of the invention to be retro-fitted to an engine not having such a system.

Optionally, the second bearing location portion is integrally formed with the second unison ring.

In one embodiment of the invention the second bearing location portion is formed as an extension of the second unison ring. This makes the second bearing location portion lighter and stronger and advantageous in weight critical applications.

In another embodiment of the invention the second bearing location portion is formed as a separate component from the second unison ring and is mechanically attached thereto by, for example, threaded fasteners. This arrangement enables the system of the invention to be retro-fitted to an engine not having such a system.

Optionally, the bearing is a rolling element bearing having an outer race, an inner race, and a plurality of rolling elements accommodated therebetween, the inner race abutting against and axially slidable over the first bearing location portion, and the outer race abutting against and axially slidable over the second bearing location portion.

The use of a conventional rolling element bearing makes the assembly of the system of the invention easier and more convenient for a user.

Optionally, the bearing comprises a plurality of rolling elements, a radially outwardly facing surface of the first bearing location portion being formed as an inner bearing race, a radially inwardly facing surface of the second bearing location portion being formed as an outer bearing race, and the plurality of rolling elements being disposed between the first bearing location portion and the second bearing location portion.

By employing the first and second bearing location portions as inner and outer bearing races respectively the system of the invention may be made lighter than an arrangement employing a separate rolling element bearing assembly.

According to a second aspect of the present invention there is provided an aircraft powerplant comprising at least one engine, a first propeller assembly, a second propeller assembly and a unison ring system according to a first aspect of the invention, each of the first and second propeller assemblies comprising a plurality of propeller blades, wherein a pitch of the blades of the first propeller assembly is altered by the first unison ring portion and a pitch of the blades of the second propeller assembly is altered by the second unison ring portion.

Optionally, the first propeller assembly rotates in an opposite direction to the second propeller assembly.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIG. 4 shows a schematic view of an aircraft powerplant according to a third embodiment of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
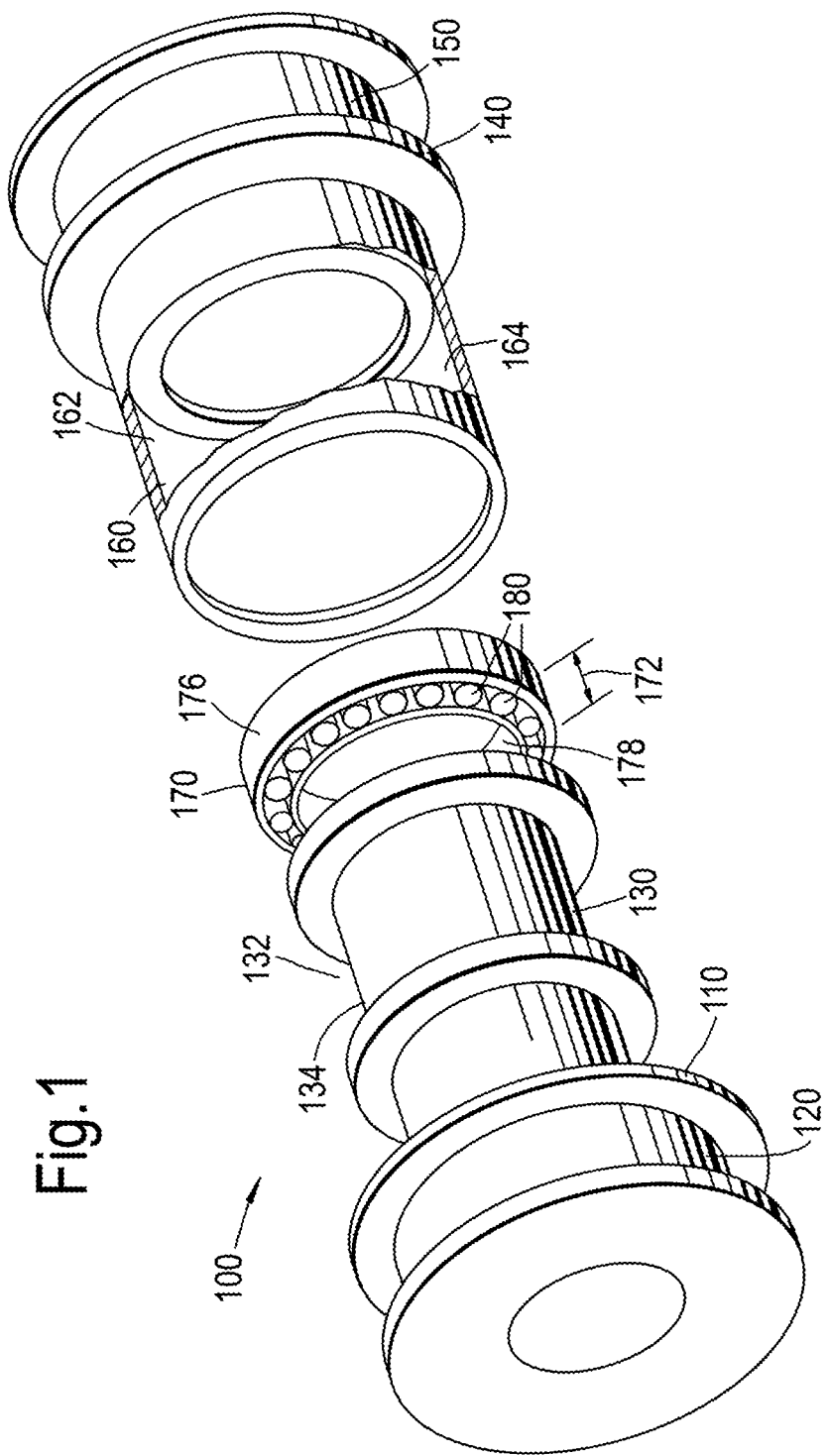
FIG. 1 shows a schematic perspective view of a unison ring system according to a first embodiment of the invention.

Referring to FIGS. 1 to 4, a unison ring system according to a first embodiment of the invention is designated generally by the reference numeral 100.

The unison ring system 100 is intended for use in an aircraft powerplant 300 having first and second contra-rotating propellers 320:330, each of the propellers 320:330 being driven by at least one engine 310 (see FIG. 4).

The unison ring system 100 comprises a first unison ring portion 110, a second unison ring portion 140 and a bearing 170. The first unison ring portion 110 is co-axial with the second unison ring portion 140.

In the present arrangement, the first unison ring portion 110 controls the pitch of the blades 340 of the first propeller 320, while the second unison ring portion 140 controls the pitch of the blades 340 of the second propeller 330.

The first unison ring portion 110 comprises a first unison ring 120 and a first bearing location portion 130. The second unison ring portion 140 comprises a second unison ring 150 and a second bearing location portion 160.

The first bearing location portion 130 is co-axial with the first unison ring 120 and projects axially from the first unison ring 120. The second bearing location portion 160 is co-axial with the second unison ring 150 and projects axially from the second unison ring 150.

Each of the first unison ring 120 and the second unison ring 150 have the same geometric form as conventional unison ring components. In other words they have a 'U'-shaped axial cross-section. In use, this 'U'-shaped radial cross section accommodates the lever arms (not shown) that operate to rotate the pitch change spindles (not shown) of the propeller blades (340).

The first bearing location portion 130 comprises a radially outwardly opening groove 132. The second bearing location portion 160 comprises a radially inwardly opening groove 162.

In the present arrangement the first unison ring portion 110 and the second unison ring portion 140 are formed from, for example, a titanium alloy material. In other arrangements, the first unison ring portion 110 and the second unison ring portion 140 may be formed from another metal or metal alloy, or from a fibre reinforced composite material.

The first unison ring portion 110 and the second unison ring portion 140 are axially positioned along the axis of the propellers 320:330. As outlined above the first unison ring portion 110 and the second unison ring portion 140 are positioned with the first bearing location portion 130 being accommodated concentrically within the second bearing location portion 160.

With the first bearing location portion 130 being positioned concentrically within the second bearing location portion 160, the radially outwardly opening groove 132 is arranged facing the radially inwardly opening groove 162 so as to define an annular cavity 190 therebetween. The annular cavity 190 has an axial length 192. The term axial length is understood in the present context to refer to a length in a direction along the axis of rotation of the unison ring system 100.

The bearing 170 is located within the annular cavity 190. In the present embodiment the bearing 190 is a rolling element bearing having an outer race 176, an inner race 178 and a plurality of rolling elements 180 that are contained between the outer race 176 and the inner race 178. The bearing 170 has an axial length 172, The outer race 176 is in intimate contact with and slidable over the radially inwardly facing surface 164 of the second bearing location portion 160. The inner race 178 is in intimate contact with and slidable over the radially outwardly facing surface 134 of the first bearing location portion 130.

In an alternative arrangement the outer race 176 is attached to the radially inwardly facing surface 164 while the inner race 178 is in intimate contact with and slidable over the radially outwardly facing surface 134.

In a further alternative arrangement, the inner race 178 is attached to the radially outwardly facing surface 134 while the outer race 176 is in intimate contact with and slidable over the radially inwardly facing surface 164.

Figure 3:
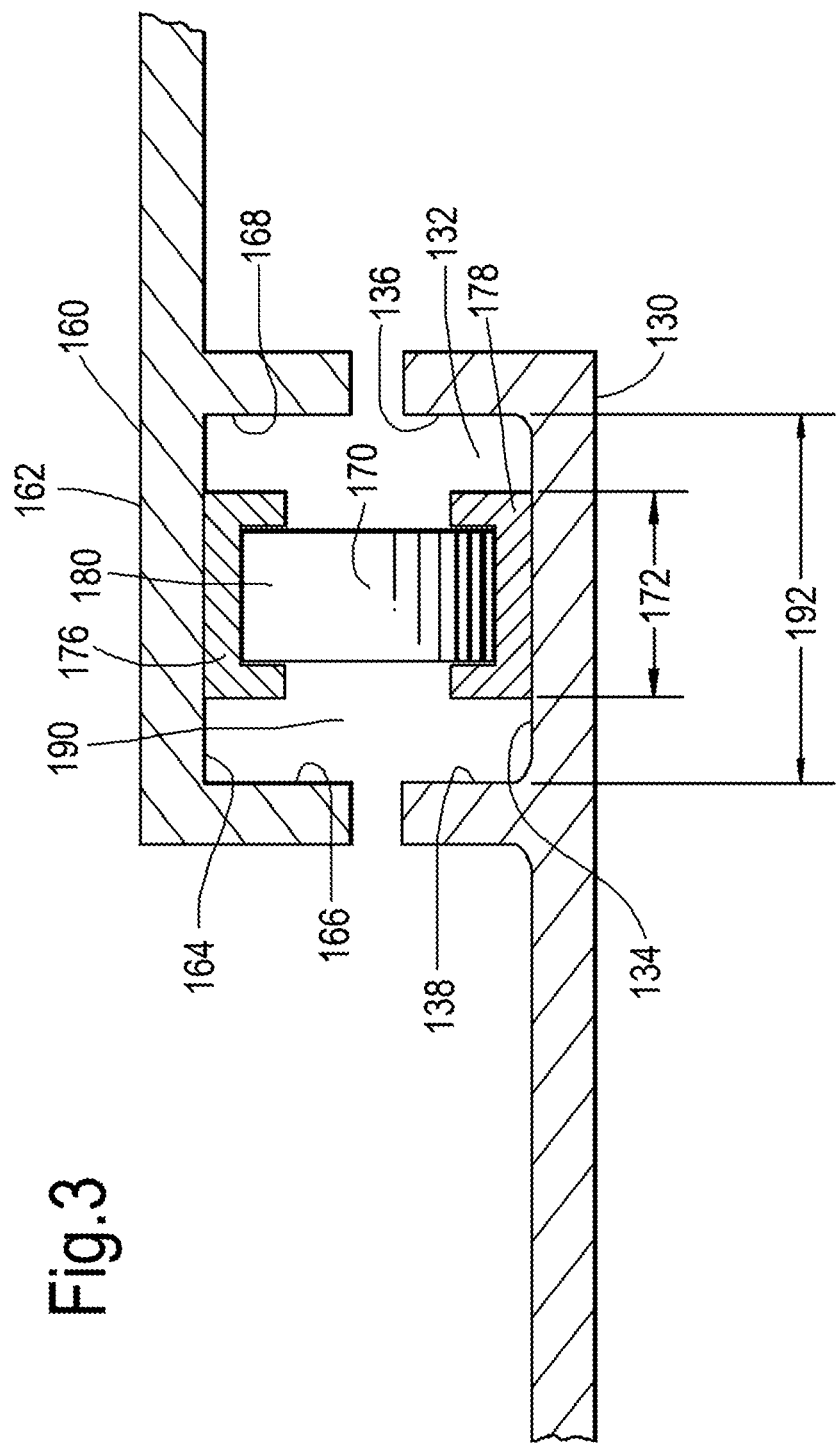
FIG. 3 shows a partial sectional view of the first and second bearing location portions of the unison ring system of FIG. 1.

As illustrated in FIG. 3, the axial length 172 of the bearing 170 is less than the axial length 192 of the annular cavity 190. Thus the first unison ring portion 110 is able to move axially relative to the second unison ring portion 140 by a distance equal to the difference between the axial length 192 of the annular cavity 190 and the axial length 172 of the bearing 170.

With the first unison ring portion 110 moving away from the second unison ring portion 140, the outer race 176 of the bearing 170 abuts against an axially distal side 166 of the radially inwardly opening groove 162 on the second bearing location portion 160, and the inner race 178 of the bearing 170 abuts against an axially distal side 136 of the radially outwardly opening groove 132 of the first bearing location portion 130.

With the first unison ring portion 110 moving towards the second unison ring portion 140, the outer race 176 of the bearing 170 abuts against an axially proximal side 168 of the radially inwardly opening groove 162 on the second bearing location portion 160, and the inner race 178 of the bearing 170 abuts against an axially proximal side 138 of the radially outwardly opening groove 132 of the first bearing location portion 130.

The distance being the difference between the axial length 192 of the annular cavity and the axial length 172 of the bearing 170 is predetermined to be greater than the difference between the positions of the first unison ring portion 110 and the second unison ring portion 140 during their normal controlled operation.

However, in the event of the failure of the actuation system for either of the first unison ring portion 110 and the second unison ring portion 140 the remaining operationally controlled unison ring portion can effect control of the failed unison ring portion.

In the system of the invention both the actuation system for each of the first unison ring portion 110 and the actuation system for the second unison ring portion 140 must be capable of driving both first and second unison ring portions 110,140 in event of the failure of either one of the individual actuation systems.

The difference between the axial length 192 of the annular cavity and the axial length 172 of the bearing 170 will mean that in the event of one of the unison ring portions being controlled by the other one of the unison ring portions, there will be a degree of suboptimal operation of the propeller that was controlled by the failed unison ring portion.

However, this sub-optimal control will allow operation of the engine and importantly will allow an operator to safely feather a propeller whose unison ring portion control has failed. As outlined above, this can provide considerable safety benefits to a pilot.

Figure 2:
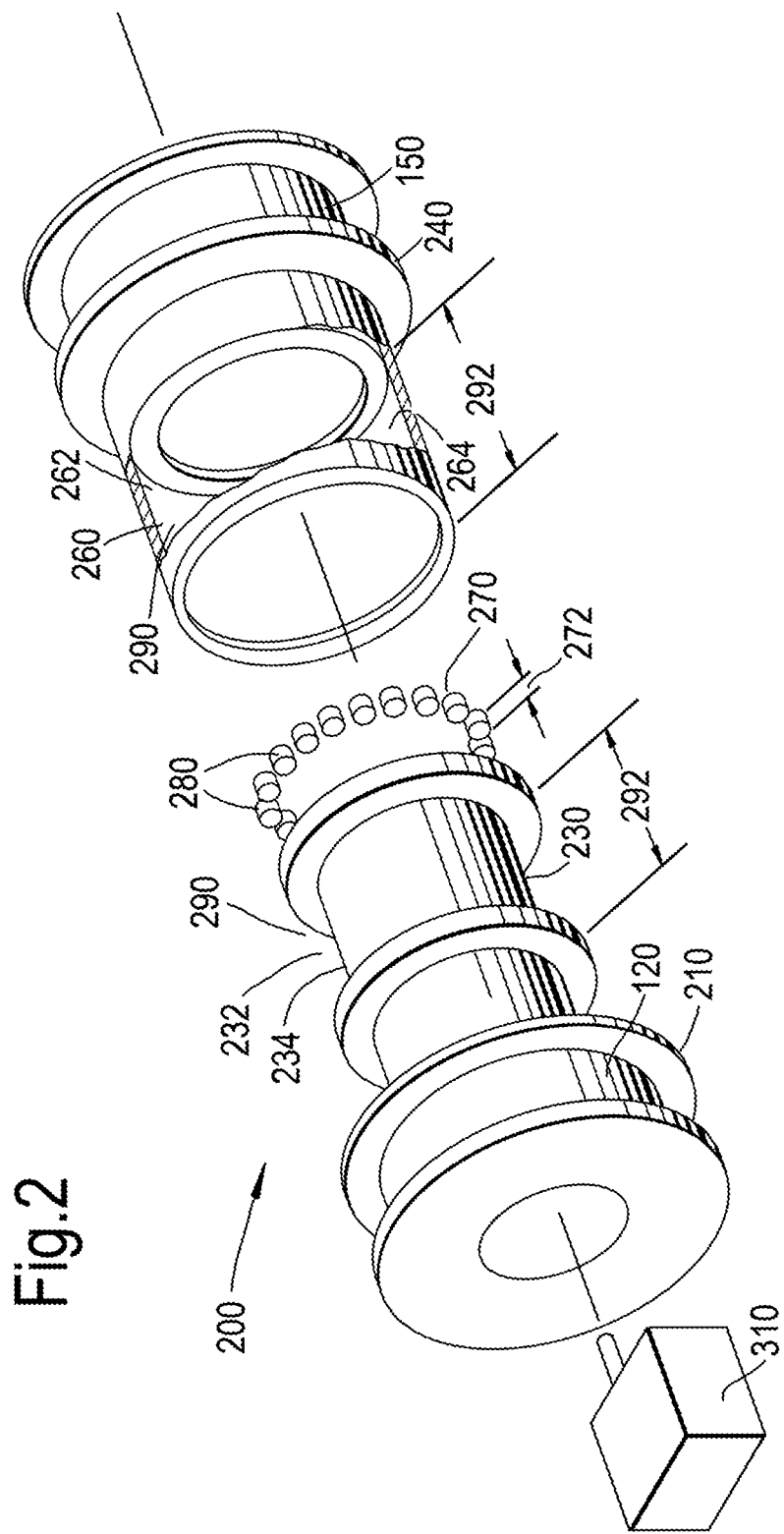
FIG. 2 shows a schematic perspective view of a unison ring system according to a second embodiment of the invention.

Referring to FIG. 2, a unison ring system according to a second embodiment of the invention is designated generally by the reference numeral 200. Features of the unison ring system 200 which correspond to those of the unison ring system 100 have been given corresponding reference numerals for ease of reference.

The unison ring system 200 has a first unison ring portion 210, a second unison ring portion 240 and a bearing 270.

The first unison ring portion 210 comprises a first unison ring 120 and a first bearing location portion 230. The second unison ring portion 240 comprises a second unison ring 150 and a second bearing location portion 260.

The structure of the first and second unison ring portions 210,240 is identical to the corresponding components of the first embodiment described above with the exception of the first and second bearing location portions 230,260.

The first bearing location portion 230 comprises a radially outwardly opening groove 232. The radially outwardly opening groove 232 comprises a radially outwardly facing surface 234 that is formed as an inner bearing race 234.

The second bearing location portion 260 comprises a radially inwardly opening groove 262. The radially inwardly opening groove 262 comprises a radially inwardly facing surface 264 that is formed as an outer bearing race 264.

With the first bearing location portion 230 being positioned concentrically within the second bearing location portion 260, the radially outwardly opening groove 232 is arranged facing the radially inwardly opening groove 262 so as to define an annular cavity 290 therebetween. The annular cavity 290 has an axial length 292.

The bearing 270 is located within the annular cavity 290. In this arrangement, the bearing 290 comprises a plurality of rolling elements 280 that are contained between the outer race 264 and the inner race 234. The bearing 270 has an axial length 272, The plurality of rolling elements 280 are in intimate contact with and slidable over the radially inwardly facing surface 264 of the second bearing location portion, and the radially outwardly facing surface 234 of the first bearing location portion 230.

The unison ring system 200 operates according to the same principles as the unison ring system 100 described previously. However in the unison ring system 200 it is the plurality of rolling elements 280 that provide for the interconnection between the first unison ring portion 210 and the second unison ring portion 240 in the event of the failure of the actuation system of one of the unison ring portions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. An aircraft powerplant comprising at least one engine, a first propeller assembly, a second propeller assembly and a unison ring system, the unison ring system comprising:
   a first unison ring portion;
   a second unison ring portion, the second unison ring portion being co-axial with the first unison ring portion; and
   a bearing;
   the first unison ring portion comprising:
      a first unison ring; and
      a first bearing location portion;
   the second unison ring portion comprising:
      a second unison ring; and
      a second bearing location portion;

wherein the first bearing location portion is co-axial with the first unison ring and projects axially from the first unison ring, the second bearing location portion is co-axial with the second unison ring and projects axially from the second unison ring, the first bearing location portion comprising a radially outwardly opening groove, the second bearing location portion comprising a radially inwardly opening groove, the first unison ring portion and the second unison ring portion being axially positioned such that the first bearing location portion is concentric with the second bearing location portion thereby defining an annular cavity there between;

the bearing being accommodated in the annular cavity, an axial length of the annular cavity being greater than an axial length of the bearing, and wherein the bearing comprises a plurality of rolling elements, a radially outwardly facing surface of the first bearing location portion being formed as an inner bearing race, a radially inwardly facing surface of the second bearing location portion being formed as an outer bearing race, and the plurality of rolling elements being disposed between the first bearing location portion and the second bearing location portion, and each of the first and second propeller assemblies comprising a plurality of propeller blades, wherein a pitch of the blades of the first propeller assembly is altered by the first unison ring portion and a pitch of the blades of the second propeller assembly is altered by the second unison ring portion.

2. The aircraft powerplant as claimed in claim 1, wherein the first propeller assembly rotates in an opposite direction to the second propeller assembly.

3. An aircraft powerplant comprising at least one engine, a first propeller assembly, a second propeller assembly and a unison ring system, the unison ring system comprising:
   a first unison ring portion;
   a second unison ring portion, the second unison ring portion being co-axial with the first unison ring portion; and
   a bearing;
   the first unison ring portion comprising:
      a first unison ring; and
      a first bearing location portion;
   the second unison ring portion comprising:
      a second unison ring; and
      a second bearing location portion;
   wherein the first bearing location portion is co-axial with the first unison ring and projects axially from the first unison ring, the first bearing location portion is integrally formed with the first unison ring, and the second bearing location portion is co-axial with the second unison ring and projects axially from the second unison ring,
   the first bearing location portion comprising a radially outwardly opening groove, the second bearing location portion comprising a radially inwardly opening groove,
   the first unison ring portion and the second unison ring portion being axially positioned such that the first bearing location portion is concentric with the second bearing location portion thereby defining an annular cavity there between;
   the bearing being accommodated in the annular cavity, an axial length of the annular cavity being greater than an axial length of the bearing, and
   wherein the bearing comprises a plurality of rolling elements, a radially outwardly facing surface of the first bearing location portion being formed as an inner bearing race, a radially inwardly facing surface of the second bearing location portion being formed as an outer bearing race, and the plurality of rolling elements being disposed between the first bearing location portion and the second bearing location portion, and each of the first and second propeller assemblies comprising a plurality of propeller blades, wherein a pitch of the blades of the first propeller assembly is altered by the first unison ring portion and a pitch of the blades of the second propeller assembly is altered by the second unison ring portion.

4. An aircraft powerplant comprising at least one engine, a first propeller assembly, a second propeller assembly and a unison ring system, the unison ring system comprising:
   a first unison ring portion;
   a second unison ring portion, the second unison ring portion being co-axial with the first unison ring portion; and
   a bearing;
   the first unison ring portion comprising:
      a first unison ring; and
      a first bearing location portion;
   the second unison ring portion comprising:
      a second unison ring; and
      a second bearing location portion;
   wherein the first bearing location portion is co-axial with the first unison ring and projects axially from the first unison ring, the second bearing location portion is co-axial with the second unison ring and projects axially from the second unison ring, and the second bearing location portion is integrally formed with the second unison ring,
   the first bearing location portion comprising a radially outwardly opening groove, the second bearing location portion comprising a radially inwardly opening groove,
   the first unison ring portion and the second unison ring portion being axially positioned such that the first bearing location portion is concentric with the second bearing location portion thereby defining an annular cavity there between;
   the bearing being accommodated in the annular cavity, an axial length of the annular cavity being greater than an axial length of the bearing, and
   wherein the bearing comprises a plurality of rolling elements, a radially outwardly facing surface of the first bearing location portion being formed as an inner bearing race, a radially inwardly facing surface of the second bearing location portion being formed as an outer bearing race, and the plurality of rolling elements being disposed between the first bearing location portion and the second bearing location portion, and each of the first and second propeller assemblies comprising a plurality of propeller blades, wherein a pitch of the blades of the first propeller assembly is altered by the first unison ring portion and a pitch of the blades of the second propeller assembly is altered by the second unison ring portion.

* * * * *